(12) United States Patent
Tariq (10) Patent No.: US 11,620,565 B1
(45) Date of Patent: Apr. 4, 2023

(54) SYSTEM AND METHOD FOR ENHANCED DISTRIBUTION OF DATA TO COMPUTE NODES

(71) Applicant: Quintiles IMS Incorporated, Danbury, CT (US)

(72) Inventor: Mir Tariq, Seattle, WA (US)

(73) Assignee: IQVIA Inc., Parsippany, NJ (US)

( * ) Notice: Subject to any disclaimer, the term of this patent is extended or adjusted under 35 U.S.C. 154(b) by 712 days.

(21) Appl. No.: 15/441,511

(22) Filed: Feb. 24, 2017

(51) Int. Cl.
*G06N 20/00* (2019.01)
*G06N 5/04* (2023.01)
*G06F 16/22* (2019.01)
*G06F 16/2455* (2019.01)

(52) U.S. Cl.
CPC ............. *G06N 20/00* (2019.01); *G06F 16/22* (2019.01); *G06F 16/2455* (2019.01); *G06N 5/04* (2013.01)

(58) Field of Classification Search
CPC .......... G06N 20/00; G06N 5/04; G06F 16/22; G06F 16/2455
See application file for complete search history.

(56) References Cited

U.S. PATENT DOCUMENTS

| | | | | |
|---|---|---|---|---|
| 7,685,109 B1 * | 3/2010 | Ransil | ...................... | G06F 16/27 |
| | | | | 707/999.003 |
| 8,370,280 B1 * | 2/2013 | Lin | ........................ | G06N 20/00 |
| | | | | 706/12 |
| 9,335,991 B1 * | 5/2016 | Dufresne | ................... | G06F 8/60 |
| 10,404,822 B2 * | 9/2019 | Whitney | .............. | G06F 16/9574 |
| 2003/0167175 A1 * | 9/2003 | Salom | .................. | G06Q 40/025 |
| | | | | 705/38 |
| 2007/0005621 A1 * | 1/2007 | Lesh | ....................... | G16H 10/60 |
| 2010/0229245 A1 * | 9/2010 | Singhal | ................... | H04L 9/321 |
| | | | | 726/28 |
| 2014/0075336 A1 * | 3/2014 | Curtis | ..................... | H04L 41/22 |
| | | | | 715/753 |

(Continued)

FOREIGN PATENT DOCUMENTS

CN           106294757 A   *   1/2017

OTHER PUBLICATIONS

Khoshkbarforoushha et al. "Resource Usage Estimation of Data Stream Processing Workloads in Datacenter Clouds" Jan. 28, 2015, arxiv.org, <https://doi.org/10.48550/arXiv.1501.07020> (Year: 2015).*

(Continued)

*Primary Examiner* — James D. Rutten
(74) *Attorney, Agent, or Firm* — Fish & Richardson P.C.

(57) ABSTRACT

A computer-implemented includes a computing system receiving one or more queries. The computing system includes one or more compute nodes that perform computations for determining a response to at least one query. The system stores, in a storage device, domain data that includes at least one of: a dataset, a metric associated with the domain data, a query time, or a usage pattern that is based, in part, on the one or more queries. The method includes the system generating a distribution model based on analysis of the domain data. The distribution model is generated using machine learning logic executed by the system. The method further includes the system using the distribution model to distribute data to the one or more compute nodes. The distributed data is used to determine, within a threshold response time, the response to the at least one query.

26 Claims, 5 Drawing Sheets

(56) References Cited

U.S. PATENT DOCUMENTS

| | | | |
|---|---|---|---|
| 2014/0181091 A1* | 6/2014 | Lassen | G06F 16/334 |
| | | | 707/723 |
| 2014/0214895 A1* | 7/2014 | Higgins | G06F 16/3325 |
| | | | 707/770 |
| 2015/0156280 A1* | 6/2015 | Vaswani | H04L 67/42 |
| | | | 709/203 |
| 2015/0242146 A1* | 8/2015 | Shinozaki | G06F 12/0868 |
| | | | 711/162 |
| 2016/0034530 A1* | 2/2016 | Nguyen | G06F 16/2471 |
| | | | 707/719 |
| 2016/0179854 A1* | 6/2016 | Van Den Handel, Jr. | |
| | | | G06F 16/22 |
| | | | 707/812 |
| 2016/0335318 A1* | 11/2016 | Gerweck | G06F 16/2282 |

OTHER PUBLICATIONS

'Statisticshowto.com' [online]. "Acyclic Graph & Directed Acyclic Graph: Definition, Examples," Apr. 2016, Statistics How to, URL: <37239-0154001>. 3 pages.

Or, Andrew,"Understanding your apache spark application through visualization," Jun. 2015, Databricks Inc., 10 pageds.

Prithviraj Bose, "Demystifying Partitioning in Spark: Edureka Blog," Mar. 23, 2016, Brain4ce Education Solutions Pvt. Ltd., 5 pages.

Zaharia et al., "Spark: Cluster computing with working sets," Aug. 2010, University of California, Berkeley, 7 pages.

Zhang et al., "Scientific computing meets big data technology: An astronomy use case," Mar. 2016, ASPIRE Lab, Uni. of California, Berkeley, 10 pages.

* cited by examiner

SYSTEM AND METHOD FOR ENHANCED DISTRIBUTION OF DATA TO COMPUTE NODES

BACKGROUND

This specification relates to distribution of data to one or more compute nodes of a distributed computing system.

Entities that manage large repositories of data may have a demand for low latency interactive computations. Interactive computations can correspond to users providing inputs to a computing system, such as making a selection, or executing a click function, and the system computing and providing an output desired by the user in a timeframe that is sufficient or tolerable to the user. Business professionals, such as executives, stock market analysts, or health scientist, may require interactive computing solutions that enable them to make informed decisions.

Distributed computing systems generally use computers that form one or more nodes and multiple nodes can form node clusters. The computers and node clusters can receive data from large datasets to perform computations that generate a response to received user input. Systems that process large datasets may rely on distributed computing to distribute data to a collection of computers that work in collaboration to generate the response. The data is typically distributed when the system receives user input in the form of query that seeks a specific response.

SUMMARY

One aspect of the subject matter described in this specification can be embodied in a computer-implemented method executed by one or more processors. The method includes, receiving, by a computing system, one or more queries, the computing system having one or more compute nodes that perform computations for determining a response to at least one query. The method further includes storing, by the computing system and in a storage device, domain data that includes at least one of: a dataset, a metric associated with the domain data, a query time, or a usage pattern that is based, in part, on the one or more queries.

The method also includes generating, by the computing system, a distribution model based on analysis of the domain data. The distribution model is generated using machine learning logic executed by the computing system. The method further includes using, by the computing system, the distribution model to distribute data to the one or more compute nodes, the distributed data being used to determine, within a threshold response time, the response to the at least one query.

These and other implementations can each optionally include one or more of the following features. For example, in some implementations, the method further includes: using, by the computing system, the distribution model to optimize distribution of data to the one or more compute nodes, and optimizing the distribution of data, includes: assigning a first subset of domain data to a first compute node to generate a first portion of the response; and assigning a second subset of domain data to at least a second compute node to generate a second portion of the response.

In some implementations, generating the distribution model includes: using, by the computing system, the machine learning logic to analyze one or more elements of the domain data; and generating, by the computing system, one or more partitioning algorithms based on the analyzed domain data. In some implementations, the distribution model encodes the one or more partitioning algorithms. The distribution model uses at least one partitioning algorithm to distribute data to particular compute nodes of the one or more compute nodes.

In some implementations, using machine learning logic executed by the computing system to generate the distribution model includes: a processor of the computing system executing at least one maximum likelihood algorithm to analyze the domain data, and to determine data partitioning logic based on the analysis. The distribution model is generated using at least the determined partitioning logic.

In some implementations, the method further includes: using, by the computing system, the distribution model to maximize a likelihood of future observations based, in part, on the usage pattern included in the domain data, wherein the future observations correspond to one or more predicted queries. In some implementations, the query time of the domain data includes at least one of: a current time, day, month, or year; or a particular time, day, month, or year that a query is received by the computing system.

In some implementations, the usage pattern is based on one or more sources of pattern behavior that include at least one of: a frequency attribute of a particular query of the one or more queries; a frequency attribute of a particular metric associated with the domain data; or a correlation of a user role with the particular query and the particular metric. In some implementations, the threshold response time is at least one of: less than 5 seconds; less than 30 seconds; or less than 60 seconds.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. The described subject matter enables efficient distribution of data among various compute nodes of an example computing system. The system uses machine learning logic including predictive algorithms that analyze historical queries and system usage patterns to optimize the distribution of data among the nodes.

The described methods further enable optimized data partitioning such that movement of data for computations at the compute nodes is minimized. The optimized partitioning and minimized data movement is realized by arranging related data subsets in the same partition of a larger set of domain data. The optimized partitioning and minimized data movement enhances computational efficiency of processors of the computing system such that the system can generate responses to received queries within a threshold response time.

When compared to conventional distributed systems, the described methods enable reduced query response times such that system throughput is increased thereby leading to more efficient processor utilization.

The details of one or more implementations of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

This specification relates to distribution of data among compute nodes of a distributed computing system such that the system can generate a response to a received query within a threshold response time. In particular, computer-implemented methods are described for enhancing distribution of data to compute nodes of a distributed computing system. Data distribution is enhanced based, in part, on the use of machine learning logic that analyzes domain data (i.e., label data) of existing data storage devices to generate a distribution model. The computing system uses the distribution model to enhance distribution of data to compute nodes of the system.

Use of the machine learning logic includes the system executing predictive algorithms to forecast computations that provide responses to certain queries within a desired response time. The computing system can include at least one data storage device that stores large sets of domain specific data. The domains can correspond to different example professional disciplines (e.g., healthcare, finance, technology, etc.).

The predictive algorithms enable domain data to be partitioned in an optimal state for distribution among the compute nodes when the system receives a particular query. The generated distribution model encodes the predictive (i.e., partitioning) algorithms. The computing system uses the model to optimally distribute data such that the speed of computations for generating responses to user queries is increased in comparison to existing distributed computing systems.

Figure 1:
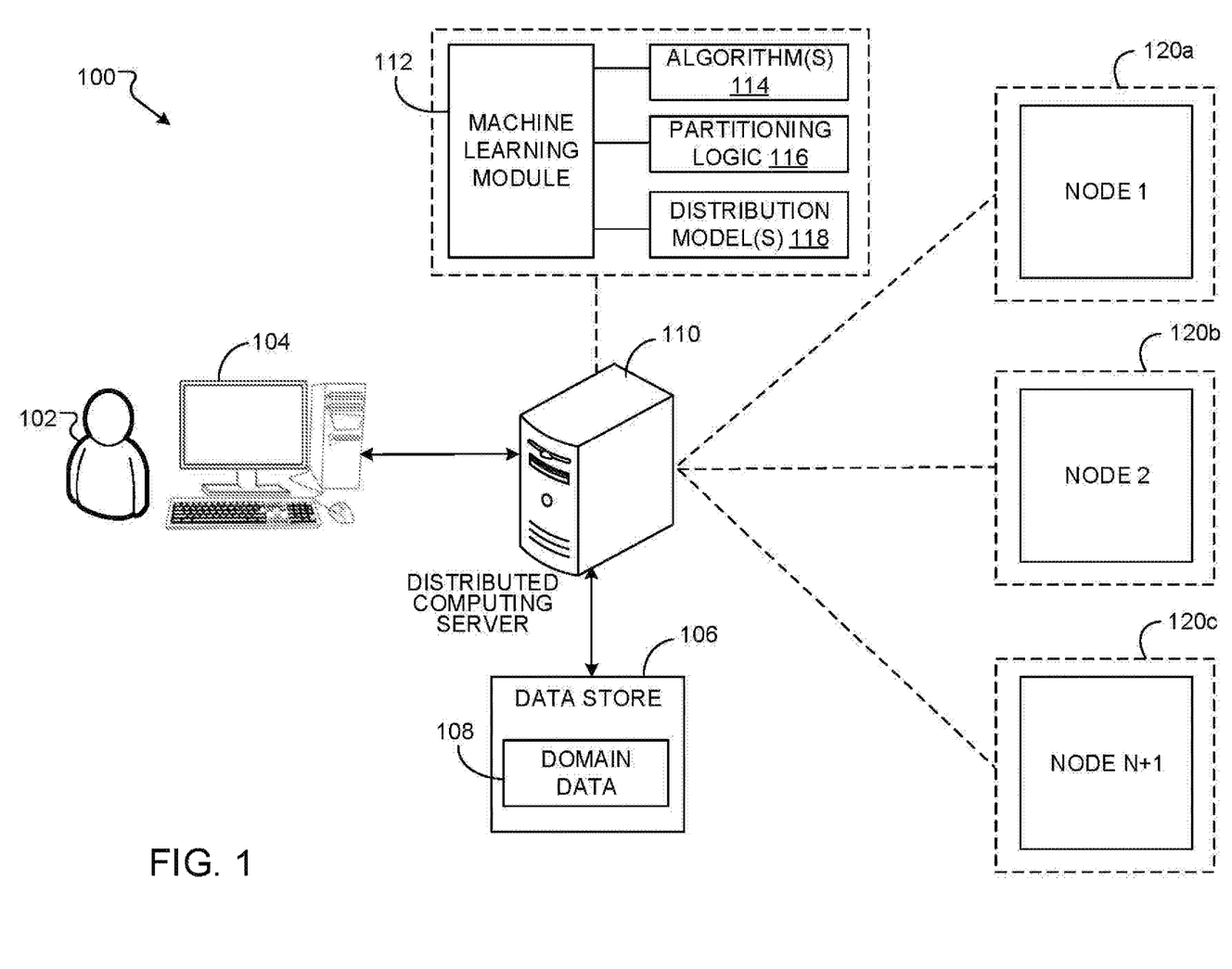
FIG. 1 illustrates a block diagram of an example computing system for performing distributed computations using one or more compute nodes.

FIG. 1 illustrates a block diagram of an example computing system 100 for performing distributed computations using one or more compute nodes. As used in this specification, nodes 120a, 120b, or 120c can each be a single computer, or multiple computers, within system 100. Computers a can include a processor and memory that stores compute logic or software instructions that are executable by the processor. Multiple computers at a node can form a cluster computing node, while multiple nodes can form node clusters.

In the systems described below, nodes 120a/b/c can be used to compute accurate responses to received queries. The computations that produce or generate responses are based on the substance or content of the query and based on data that is distributed to the nodes by the described systems.

System 100 includes user console 104, data storage device ("data store") 106, and computing device 110. Although depicted in FIG. 1 as a desktop computer, console 104 can be any known computer system, such as a desktop computer, a laptop computer, a tablet device, a mobile device, or any other related computing device that receives user input.

In general, console 104 is configured to receive user input from a human user 102 and provide the user input to computing device 110 for performing one or more distributed computations. In some implementations, console 104 is one of multiple computing devices that are disposed within an example computer network. The computer network can generally include at least one data store or storage device such as data store 106.

As described in more detail below, the user input can be a query in which user 102 seeks a response from system 100. As shown in FIG. 1, computing device 110 can include, or be configured to access, multiple computing nodes 120a/b/c as well as data store 106. Computing device 110 can be further configured to analyze the received query and access data store 106 to obtain portions of data that can be used to compute a response to the query. Data accessed from data store 106 is distributed to one or more nodes 120a/b/c for performing computations to generate a response to the query.

Data store 106 can be an example computing resource(s) configured to store large amounts of data (e.g., large datasets exceeding 5 terabytes (TB) or more). Example computing resources for data storage can include various electronic data storage devices that use electrical power to store and retrieve data. The data can be stored in either an analog format or a digital format and can be stored on a variety of media. Example data storage devices can include hard drives, server based storage devices, or cloud storage systems including multiple distinct devices.

Data store 106 can include domain data 108. As described in more detail below, domain data 108 can include multiple queries received by system 100. The multiples queries can be received from one or more users via a single console 104, from multiple distinct users 102 via a single console 104, or from multiple distinct users 102 via multiple distinct consoles 104. Domain data 108 can include data related to a wide variety of subject matter or domains. The domains can correspond, for example, to disciplines, such as healthcare, finance, technology, engineering, information technology, health and nutrition, law, etc.

During operation, system 100 receives and stores domain data 108 in data store 106. Domain data 108 can include one or more large datasets. In some instances, the collective size of data stored in data store 106 can range from 1 TB to 5 TB; while in other instances, the collective size of data stored in data store 106 can exceed 5 TB.

In some implementations, domain data 108 can include one or more of the following data elements: domain specific datasets, domain specific metrics, query times for respective queries received by system 100, usage patterns that are based on, or that correspond to, the multiple queries received by the system, or usage patterns that are based on, or that correspond to, the domain specific metrics.

Domain specific datasets can include a variety of electronic data that describe or indicate characteristics of a particular domain or that describe or indicate characteristics of particular users 102 that submit or provide queries/user input received by system 100. For example, datasets can include listings or elements that correspond to multiple queries or general factual data that has been received and stored by system 100, over a particular time period. While domain specific datasets can include listings or elements that associate or categorize received queries or general factual data as being related to particular domains or subject matter.

In some implementations, datasets can include listings of entities or items that span a variety of content areas. For example, the listings can include items such as pharmaceutical drugs, airline flights at JFK, or movie Actors. In addition to the listings, the datasets can also include item descriptions, such as pharmaceutical drug package sizes, flight arrival times and flight departure times, or movies the actors have worked on. In some instances, the descriptions of listing items of a dataset can also include numerical values, such as sales values, profits values, or flight numbers.

In some implementations, the listings or elements of a dataset can be in a row, column format, or can be formatted and stored as example relational databases, data frames, or other comparable data structures, such as pre-aggregated tables or cubes. In some implementations, data listings or elements can be a table having sets of columns and rows.

As an example that can be generalized to a variety of domains, columns may represent different fields, e.g., customer/employee name, query type, user name, role or title/position, address, phone no., device name, product descriptor, etc. While rows may correspond to feature records that indicate an actual name (e.g., Bob), address (e.g., 123 Main Street), phone no. (e.g., 555-5555), title/role (e.g., president, engineer) etc. Other aspects or elements of domain data 108 (e.g., metrics, time parameters, and usage patterns) are described in more detail with reference to FIG. 2 and FIG. 3 below.

In general, data store 106 can be configured to store domain data 108 in an example data format such that individual data elements (e.g., distinct row, column elements) can be analyzed, accessed, and/or distributed across one or more computing nodes 120a/b/c when system 100 executes computations for generating responses to received queries.

As shown in FIG. 1, computing device 110 can include, or be configured to access, machine learning module 112. Device 110 and machine learning module 112 can each include processing units or devices that can include one or more processors (e.g., microprocessors or central processing units (CPUs)), graphics processing units (GPUs), application specific integrated circuits (ASICs), or a combination of different processors.

In alternative embodiments, device 110 and module 112, can each include other computing resources/devices (e.g., cloud-based servers) that provide additional processing options for performing one or more of the machine learning determinations and computations described in this specification. The processing units or devices can further include one or more memory units or memory banks. In some implementations, the processing units execute programmed instructions stored in memory to cause device 110 and module 112 to perform one or more functions described in this specification.

The memory units/banks can include one or more non-transitory machine-readable storage mediums. The non-transitory machine-readable storage medium can include solid-state memory, magnetic disk, and optical disk, a random access memory (RAM), a read-only memory (ROM), an erasable programmable read-only memory (e.g., EPROM, EEPROM, or Flash memory), or any other tangible medium capable of storing information.

Referring again to FIG. 1, module 112 can include one or more algorithms 114, partitioning logic 116, and one or more distribution models 118. As described in more detail below, machine learning module 112 can be configured to use, or execute, example machine learning logic to analyze received queries as well as to access and analyze domain data 108 stored in data store 106. The machine learning logic can include one or more algorithms 114.

In general, machine learning relates to categories of algorithms in computer sciences that, when implemented, enable systems to exhibit abilities to learn patterns in data. Machine learning can therefore come under the broader category of Artificial Intelligence. For example, learning patterns can correspond to learning or interpreting handwriting samples where there are differences from one sample to another as well as certain underlying distinct features of each hand written character.

Machine learning includes mapping a set of inputs, such as images of handwritings that may be collections of pixels. Machine learning also includes mapping a set of output(s) which, in the handwriting example, can be sets of alphabet letters that are detected. The described subject matter can include supervised machine learning. In the handwriting example context, supervised learning is a machine learning sub-category marked by an availability of actual samples of handwriting and the samples correct labels of alphabets verified by a human.

For the described subject matter, example inputs for at least one machine learning process can include: a) datasets, such as entities/items, their descriptions and their numerical values (e.g., measures such as sales, number of marketing calls, or some value of interest); b) user personas, e.g., employee roles, such as executive, manager, or analyst, in which different roles have different expected usage patterns; c) metrics, such as numerical values that have particular meaning in a domain (e.g., net profit, GDP, life expectancy after cancer diagnosis, or growth rate); d) queries submitted to system 100, such as questions about the dataset, where the questions usually include one or more metrics; e) query submissions during different parts of the day or day of the week or month; f) a number of computing nodes in system 100; and g) computational resources of system 100, such as processing power, or disk space/memory at each node.

Example outputs for at least one machine learning process can include optimal distributions of datasets for a given configuration of system 100. An example distribution can include Node 1 receiving datasets from rows 0 to 200,000 of an example table 1, as well as Node 1 receiving datasets from rows 500,000 to 1,000,000 of an example table 2. The distribution can further include Node 2 receiving datasets from rows 0 to 200,000 of the example table 1, as well as Node 2 receiving datasets from rows 70,000 to 80,000 of the example table 2.

In general, the distribution can include "N" number of rows (Node N+1) receiving datasets from example rows 20,000,000 to 40,000,000 of an example table 1 and receiving datasets from example rows 70,000 to 80,000 of the example table 2.

In some implementations, the described machine learning process uses statistical models that can include probability distribution functions, such as a Gaussian Distribution. Use of the statistical models enables dynamic learning of certain parameter values. Statistical models with high versatility can represent a wide array of different types of problems and domains.

Models have a learning phase in which parameter values are learned. Parameters for a statistical model can be determined using different schemes. Maximum Likelihood Estimation (MLE) is an approach that can be used to determine parameters. A goal of parameter determination is to obtain values of parameters that will maximize a likelihood of labeled data or known observations.

In some implementations, algorithms 114 are associated with program code or software instructions that are executable by processors of module 112 that perform computations related to neural network inference workloads. In some implementations, algorithms 114 can be example maximum likelihood estimation algorithms, or other related commodity algorithms that are used to train a machine learning model.

In some instances, a model can be trained based on inferences learned, or computations performed, by a neural network. As discussed below, the model can be trained to, for example, detect patterns or associations relating to received queries as well as patterns or associations relating to various elements of domain data 108. The detected patterns or associations can be used by module 112 to determine partitioning strategies that minimize data shuffling and optimize data distribution to compute nodes 120a/b/c.

In response to training the machine learning model, module 112 can then generate, and store, partitioning logic 116. In some implementations, partitioning logic 116 can include one or more predictive algorithms (e.g., partitioning algorithms). In some instances, the partitioning algorithms are associated with program code or software instructions that are executable by processors of device 110 to, for example, distribute portions of domain data 108 to compute nodes 120a/b/c.

Machine learning module 112 generates one or more distribution models 118 based on the stored partitioning logic 116. In some implementations, partitioning logic 116 includes multiple predictive algorithms that correspond to partitioning strategies for a variety of domains or subject matter. For example, the predictive algorithms can be represented as, or associated with, program code or software instructions that are executable by processors of device 110. The program code or software instructions can include coded commands relating to steps, rules, processes, strategies, or calculations to be executed for optimally distributing portions of domain data 108 to compute nodes 120a/b/c.

Distribution model 118 can be generated based on one or more of the multiple predictive algorithms. The generated model 118 can encode the predictive algorithms as software instructions and can be deployed or implemented in an example computer network. Once deployed, and accessible by user 102, model 118 and can be used, via device 110, to efficiently and optimally distribute elements of domain data 108 to compute nodes 120a/b/c. The efficient and optimized distribution of data elements to nodes 120a/b/c causes system 100 to generate query responses within a response time that is substantially less than current distributed computing systems.

Figure 2:
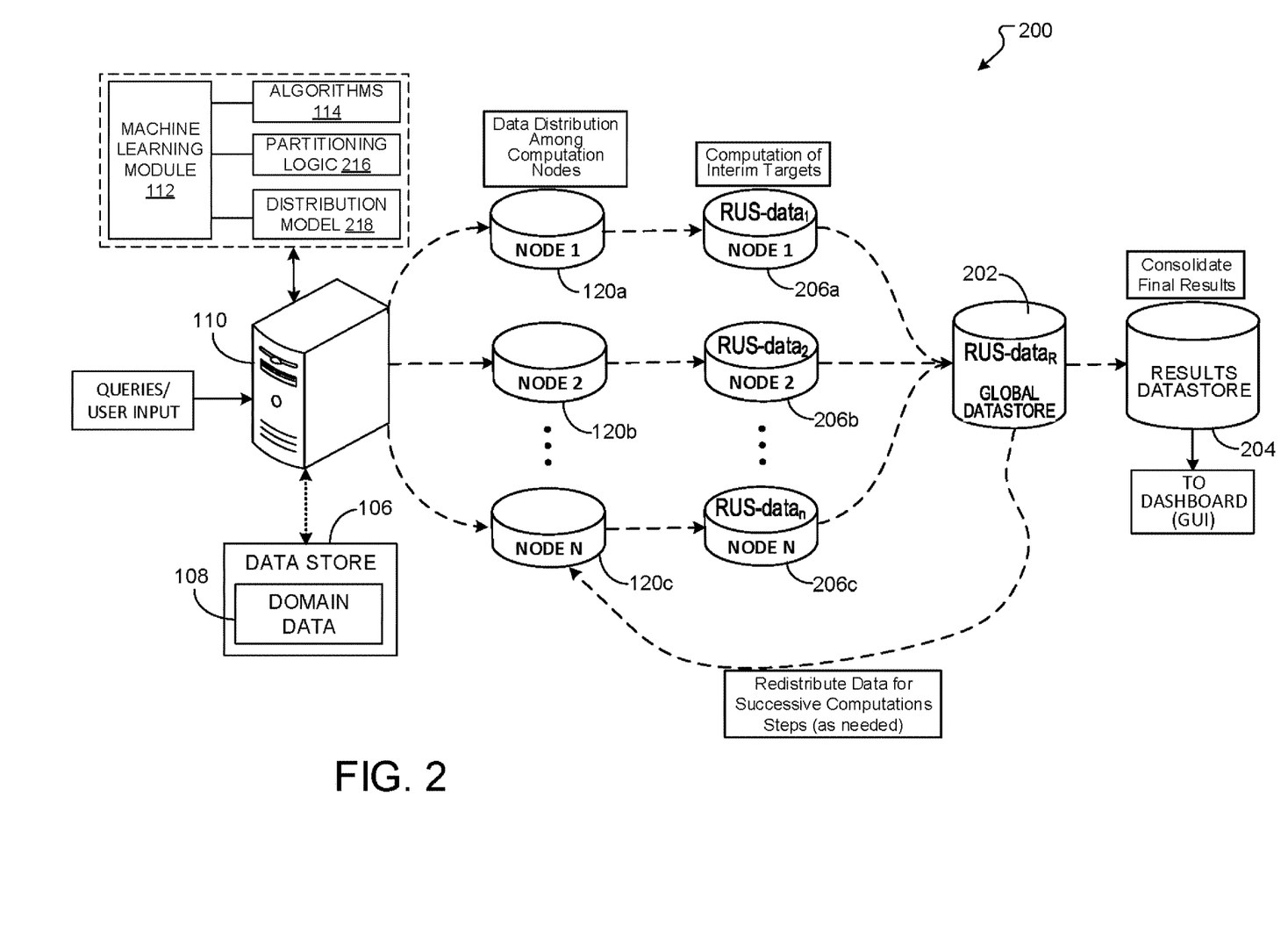
FIG. 2 illustrates a block diagram of an example computing system for distributing data among one or more compute nodes.

FIG. 2 illustrates a block diagram of an example computing system 200 for distributing data among one or more compute nodes. In some implementations, system 200 can be a sub-system of system 100. Hence, processes relating to system 200 can be implemented using computing/processing resources described above with reference to system 100.

System 200 generally includes interim computation targets 206a/b/c, global data store 202, and results data store 204. In the implementation of FIG. 2, module 112 includes partitioning logic 216 and a distribution model 218 that can each be generated based on domain specific queries, and based on stored/analyzed domain data 108 that is specific to at least one domain (e.g., healthcare, finance, medicine, economics, etc.).

The above descriptions of logic 116 and model 118 apply also to logic 216 and model 218 of system 200. Expanding upon the above description of module 112, computing system 200 can be configured to use machine learning logic executed by processors of system 200 to generate distribution model 218.

As discussed above, in addition to domain specific datasets, domain data 108 can also include domain specific metrics, query times for respective queries received by system 200, usage patterns for multiple domain specific queries received by the system, or usage patterns for the domain specific metrics.

In some implementations, query times for respective queries can include a current time (including day, month, or year) for when a query is received by systems 100/200. Query times can also include numerical indicators stored in domain data 108 that represent a day, month or year that a query was received by systems 100/200.

In some implementations, usage patterns (e.g., for domain specific metrics and queries) can be based on one or more sources of pattern behavior. The sources of pattern behavior can include at least one of: 1) a frequency attribute that indicates how often particular queries, or types of queries, are received by system 200; 2) a frequency attribute that indicates how often certain metrics are correlated with other elements (e.g., queries or datasets) of domain data 108; 3) or a frequency or pattern relating to correlations of certain user roles with particular queries and/or particular metrics.

For example, sources of pattern behavior that form usage patterns can include how often user 102 (e.g., a physicist) queries system 200 to determine a mathematical formula that pertains to certain research (e.g., "what Einstein general relativity equations were used in the Smith research project?"), or how often user 102 (e.g., a doctor) queries system 200 to determine certain patient cancer metrics (e.g., "what is the cancer mortality rate of patients in South America?"), or how often user 102 (e.g., manager/executive) at company X queries system 200 to determine client specific information (e.g., "what is Smith Inc.'s net gains or losses to date?").

In some implementation, data metrics, or domain specific metrics, can include numerical values of interest in a particular domain or subject matter. For example, for domains that pertain to business or economics, metrics can include items such as gross sales, net profits/gains, net loss, or cost of materials. For country specific economics, other metrics can include gross domestic product (GDP), GDP growth, population growth, human development indices, or any other items, or indicators, that pertain to business or economics subject matter.

Additionally, in example domains pertaining to healthcare or marketing, metrics can include items such as calls made, calls per specialty, patient data, nurse or doctor data, disease mortality rates, or any other items, or indicators, pertaining to healthcare or marketing subject matter.

Further, in example domains pertaining to finance or the stock market, metrics can include data items that quantify gains and/or losses in securities, as well as items that can be referenced as market indicators, (e.g., NASDAQ or S&P 500 index). Likewise, for example domains pertaining to global climate study, metrics can include average daily temperature for a certain climate region or terrain and elevation data.

During operation of system 200, module 112 uses machine-learning algorithms 114 to analyze stored data and user inputs received by device 110 over a predefined time period. As indicated above, algorithms 114 can be one or more example maximum likelihood estimation algorithms, or other related commodity algorithms that are used to train a machine learning model. In some implementations, the predefined time period can range from less than one day, to more than three months and can be defined based on the size and complexity of domain data 108. In general, a desired time period is selected that is sufficient to generate a model 218 that allows for efficient distribution of data 108 to nodes 120*a/b/c*.

During the predefined time period, an example machine learning model is trained using machine learning logic that includes at least one maximum likelihood algorithm 114. During model training, stored elements of data 108 and user inputs received by device 110 are analyzed. Partitioning algorithms (i.e., partitioning logic 216) are generated by module 112 based on the analyzed inputs and domain data 108. The generated partitioning algorithms encode, or codify, learned inferences based on detected usage patterns in domain data 108. The usage patterns are detected based on the analysis of stored data and user inputs.

In some instances, the partitioning algorithm can be automatically generated to arrange related data subsets of domain data 108 into the same partition. For example, the partitioning algorithm can be used to substantially reduce system processing time spent moving data between different compute nodes 120*a/b/c* at boundaries of different compute stages. In some instances, moving data for computations can also pertain to data transfers that occur between partitions of an example data frame.

In either scenario, use of logic 216 reduces processing time associated with moving data for computations by nodes 120*a/b/c*. For example, processing time is reduced (and system latency improved) based on observed, or analyzed, usage patterns of domain data 108. The patterns provide useful indicators such that an optimal partitioning strategy for data distribution among cluster computing nodes 120*a/b/c* can be determined. Thus, subsets of related data in data store 106 can be efficiently arranged in the same partition to minimize unnecessary data transfers.

When the example machine learning model is trained, module 112 can generate distribution model 218. In some implementations, distribution model 218 encodes the automatically generated partitioning algorithms. Hence, upon deployment in an example computer network, model 218 can use at least one encoded partitioning algorithm to distribute data to particular compute nodes 120*a/b/c*.

Once generated, model 218 is used to forecast expected operations. In some implementations, operations can be forecasted for subsequent time windows, such as five-minute, ten-minute, or 30-minute time windows. For example, system 200 can use distribution model 218 to maximize a likelihood of future observations. The future observations can correspond to one or more predicted queries. The maximized likelihood is based, in part, on observed usage patterns (e.g., learned inferences) that are encoded in partitioning logic 216, and that were detected from analysis of domain data 108.

In some implementations, the forecasted operations are used by system 200 to pre-emptively distribute data 108 to nodes 120*a/b/c* and to increase the computational speed of system 200. The increased computational speed enables system 200 to provide responses to received queries within a threshold response time (i.e., reduced system latency). For example, the threshold response time can be less than 5 seconds; less than 30 seconds; less than 60 seconds, or less than 5-minutes. These query response times are substantially less than current distributed computing systems.

Referring again to the operation of system 200, as noted above, device 110 receives user input in the form of a query that seeks a response. In some instances, device 110 can analyze the substance or content of the query and access data store 106 to obtain portions of domain data 108 for computing a response to the query. Device 110 can then use distribution model 218 to manage or define an optimized distribution strategy for providing, or allocating, the portions of data to the compute nodes 120*a/b/c*.

As shown in FIG. 2, portions of domain data 108 retrieved from data store 106 are distributed to one or more nodes 120*a/b/c* for performing computations to generate the response to the query. When compared to current distributed computing systems, system 200 can use distribution model 218 to optimize distribution of data to compute nodes 120*a/b/c*. In some implementations, optimizing the distribution of data can include using logic 216 to pre-aggregate certain data portions into related data subsets.

For example, optimizing distribution of data can include device 110: 1) assigning at least a first subset of domain data 108 to a first compute node (e.g., node 120*a*) to compute a first portion of the response; and 2) assigning at least a second subset of domain data 108 to at least a second compute node (e.g., node 120*b/c*) to compute a second portion of the response. Although this described example indicates first and second compute nodes, it should be understood that multiple compute nodes (e.g., 1, 2, 10, 100, or N+ nodes) may receive, or be assigned, distributed data for computing respective portions of a complete response.

Aspects of optimized data distribution can include partitioning related datasets to minimize processing time related to data movement such that computational efficiency of processors of system 100, 200 is enhanced. Aspects of optimized data distribution can further include system 100, 200 generating responses to received queries within a threshold response time based on portions of domain data 108 being partitioned in related sets and based on the minimized data movement when the system performs computations to generate query responses.

In some implementations, optimized data distribution can be quantified with reference to system 200 computing responses to received queries within a threshold response time. For example, optimized data distribution can correspond to system 200 generating an accurate query response within an example threshold response time of less than 5 seconds. Likewise, optimized data distribution can correspond to system 200 generating an accurate query response within an example threshold response time of less than 30 seconds, less than 60 seconds, or less than 2-minutes. These query response times are substantially less than response times of current distributed computing systems and provide an indication of the optimized data distribution aspects of the described system and methods of the specification.

Referring again to FIG. 2, in some implementations, compute nodes 120*a/b/c* can each compute interim response targets (206*a/b/c*) before system 200 computes, or generates, a final/complete response. In some instances, generating a particular query response can require multiple compute iterations. The multiple compute iterations can involve nodes 120*a/b/c* computing multiple interim targets. Interim targets 206*a/b/c* can be stored in global data store 202 and complete responses can be stored in results data store 204.

In some implementations, global data store 202 can be configured to store large sets of computed interim response targets. In some instances, an interim response target computed by node 120a may be needed by compute node 120c (or node 120a needing an interim target from node 120c/b) for system 200 to generate a complete response to the query. Thus, interim response targets 206a/b/c that are stored in data store 202 can be redistributed as data to one or more other compute nodes for completing successive steps of a multi-step computation (as needed).

In these computation scenarios, global data store 202 functions as a global storage device that can aggregate large sets of interim response targets 206a/b/c. The interim targets can then be accessed, or used, by other compute nodes 120 a/b/c to generate complete query responses. System 200 can be configured to merge multiple complete responses to produce a coherent set of results for storage in data store 204. Result sets in data store 204 can be accessed and used to display query responses via an example dashboard GUI (described below) viewable at console 104.

Figure 3:
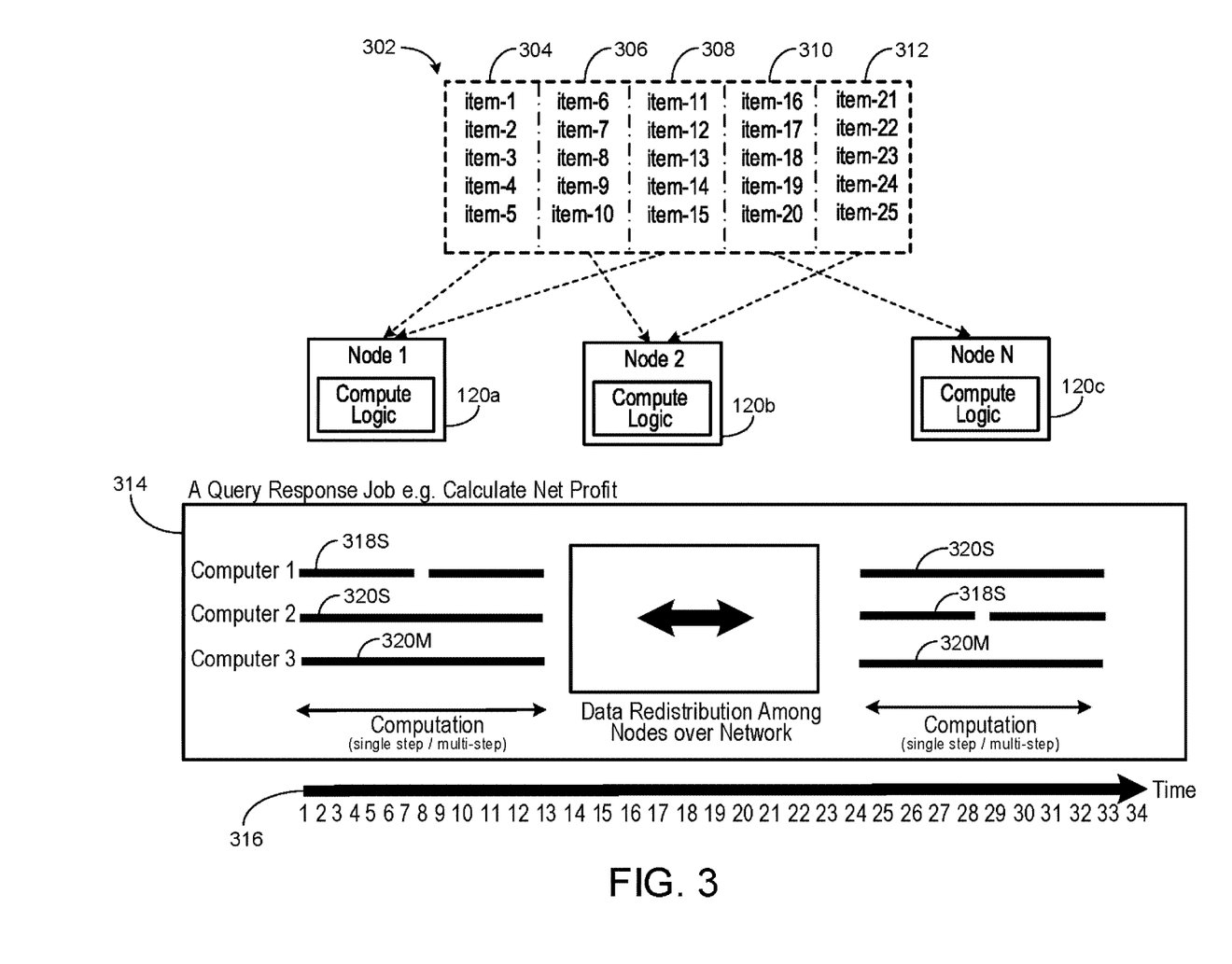
FIG. 3 illustrates a block diagram showing distribution of example data among compute nodes and showing example time attributes for computations among the compute nodes.

FIG. 3 illustrates a block diagram showing distribution of example data among compute nodes 120 a/b/c and showing example time attributes for computations among the nodes. As discussed above, data can be pre-distributed such that data partitioning is optimized for certain queries. For example, table 302 can be an example data table that is stored in data store 106 as a subset of a larger set of domain data 108. In some instances, certain items, columns, or elements of table 302 can be segmented or divided to form, or align with, example data partitions. Thus, table 302 can include segments 304, 306, 308, 310, and 312.

As shown in FIG. 3, items 1-5 of segment 304, and items 11-15 of segment 308 can each be related data subsets that are arranged in the same partition. Likewise, items 6-10 of segment 306, and items 21-25 of segment 312 can each be related data subsets that are arranged in the same partition; while items 16-20 of segment 310 can each be related data subsets that are arranged in the same partition.

In some implementations, different example partitions can be associated with respective nodes 120a, 120b, and 120c. For example, node 120a can compute responses for queries in which data subsets of segments 304, 308 are distributed to the node to compute timely and accurate responses. Node 120b can compute responses for queries in which data subsets of segments 306, 312 are distributed to the node to compute timely and accurate responses. Likewise, node 120c can compute responses for queries in which data subsets of segments 310 are distributed to the node to compute timely and accurate responses.

For clarity, the term data subset can refer to distinct data elements or data items of domain data 108. As discussed above, domain data 108 can include datasets, metrics, query times, and usage patterns, such as frequency attributes of metrics and queries. Hence, example items 1-25 of the data subsets of table 302 can include: a) datasets (e.g., see row/column examples above); b) metrics (GDP $10M, net gain/loss $50 k, etc.); c) query date/times (e.g., 9 am, Mon, Feb. 28, 2015); and d) usage patterns—e.g., business query type "A" occurs 15× on Mondays at approximately 9 am, GDP accessed for economic query type "B" 36× in last week of month, manager X submits 53 finance queries every Tuesday.

The implementation of FIG. 3 further includes an example timing diagram 314 that has an example time bar 316. Time bar 316 includes numerical values that can correspond to seconds or minutes. For example, the depicted values 1-34 can correspond to either 1 second-34 seconds or 1 minute-34 minutes. Diagram 314 also includes example time attributes for computations performed by example computers of respective nodes 120a/b/c.

In diagram 314, computers 1 and 2 can be example computers at nodes 120a, 120b, or 120c; while computer 3 can be an example computer associated with current distributed computing system that does not include, or incorporate, at least machine learning module 112. As discussed above, distribution models 118, 218 can be used to increase the speed in which computations occur at nodes 120a/b/c. Hence, model 218 enables system 200 to provide responses to received queries within a threshold response time, such that system 200 achieves reduced response latency relative to current distribution systems.

For example, as shown in diagram 314, a query can be received at device 110 that seeks a response relating to a net profit calculation. For system 200, use of distribution model 218 can enable data pre-aggregation and related data arrangement for optimized data distribution of example business/finance data to computer 1 of node 120a. Based on the optimized distribution, node 120a can then use compute logic to compute and generate an accurate net profit calculation (i.e., query response) within a threshold response time, such as less than 10 seconds.

As shown by time indicator 318S, use of distribution model 218 enables computations for the example net profit calculation (or another query response job) to be performed by computer 1 in a manner of seconds when the numerical values of time bar 316 correspond to seconds rather than minutes. In some implementations, computations for an example query can include multiple steps or stages and, thus, can be multi-step computations.

For multi-step computations, as shown by either computer 1, or computer 2, use of model 218 enables an initial step/stage of the multi-step computation to be performed by computer 1, 2 in, e.g., 6 seconds or 12 seconds, represented by indicators 318S, 320S respectively. Likewise, model 218 enables a subsequent step/stage of the multi-step computation to be performed by computer 1, 2 in, e.g., 12 seconds or 6 seconds, represented by indicators 320S, 318S respectively.

In contrast, as shown by time indicator 320M, current distributed computing systems that do not implement the optimized data distribution enabled by distribution models 118, 218 require substantially longer durations to perform computations. For example, a net profit calculation (or another query response job) is performed by computer 3 in excess of 10 minutes when the numerical values of time bar 316 correspond to minutes rather than minutes. Moreover, multi-step computations can require durations that exceed 18 minutes for performing computations.

Figure 4:
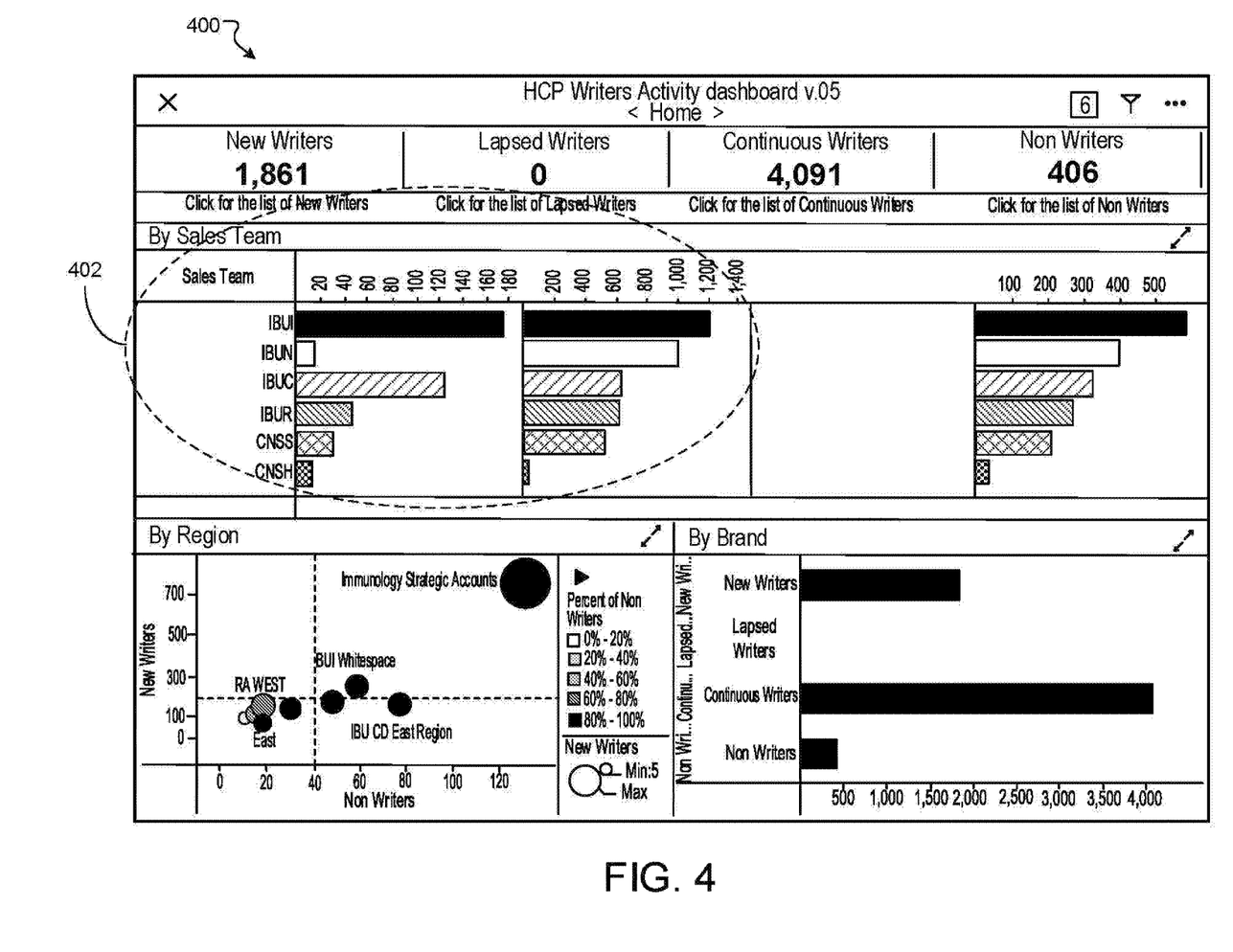
FIG. 4 illustrates an example user interface for receiving user input and for providing a response to a particular user input.

FIG. 4 illustrates an example user interface ("dashboard") 400 for receiving user input and for providing a response to a particular user input, such as query that seeks a response. As mentioned above, system 100 can use query response data to generate dashboard 400 on an example display screen, or monitor, of console 104. For example, result sets in data store 204 can be accessed and used to display query responses via an example dashboard GUI viewable at console 104. Dashboard 400 can be a group of charts, query responses, and data indicators which represent numerical values associated with different metrics.

In some instances, dashboard 400 can be configured to include variations in display content based on the purpose of the dashboard, or based on the subject matter or domain associated with the dashboard. For example, dashboard 400 can vary display content when configured as a marketing dashboard for the business or marketing domain, as a CRM dashboard for customer relations management domain, or as a sales-focused dashboard when configured for the sales and business development domain (402).

In some implementations, dashboard 400 is configured to display content that provides advanced analytics which, for example, allows user 102 to find meaningful metrics and patterns from a range of data sources used to generate accurate query responses. Dashboard 400 can be configured to provide a rich user interface that aggregates content from visualization engines including example data servers and web based resources of an example computer network.

In some implementations, dashboard 400 incorporates a software architecture that uses at least one software as a service (SaaS) model. In some instances, use of the SaaS model allows datacenter like capability that is consumable with the display format of dashboard 400. In some instances, dashboard 400 is generated based on common patterns associated with at least data stores 106, 202, and 204. This allows for more efficient use of hardware processor resources of system 100 based on multi-tenant patterns and elastic scalability relating to the stored data.

Figure 5:
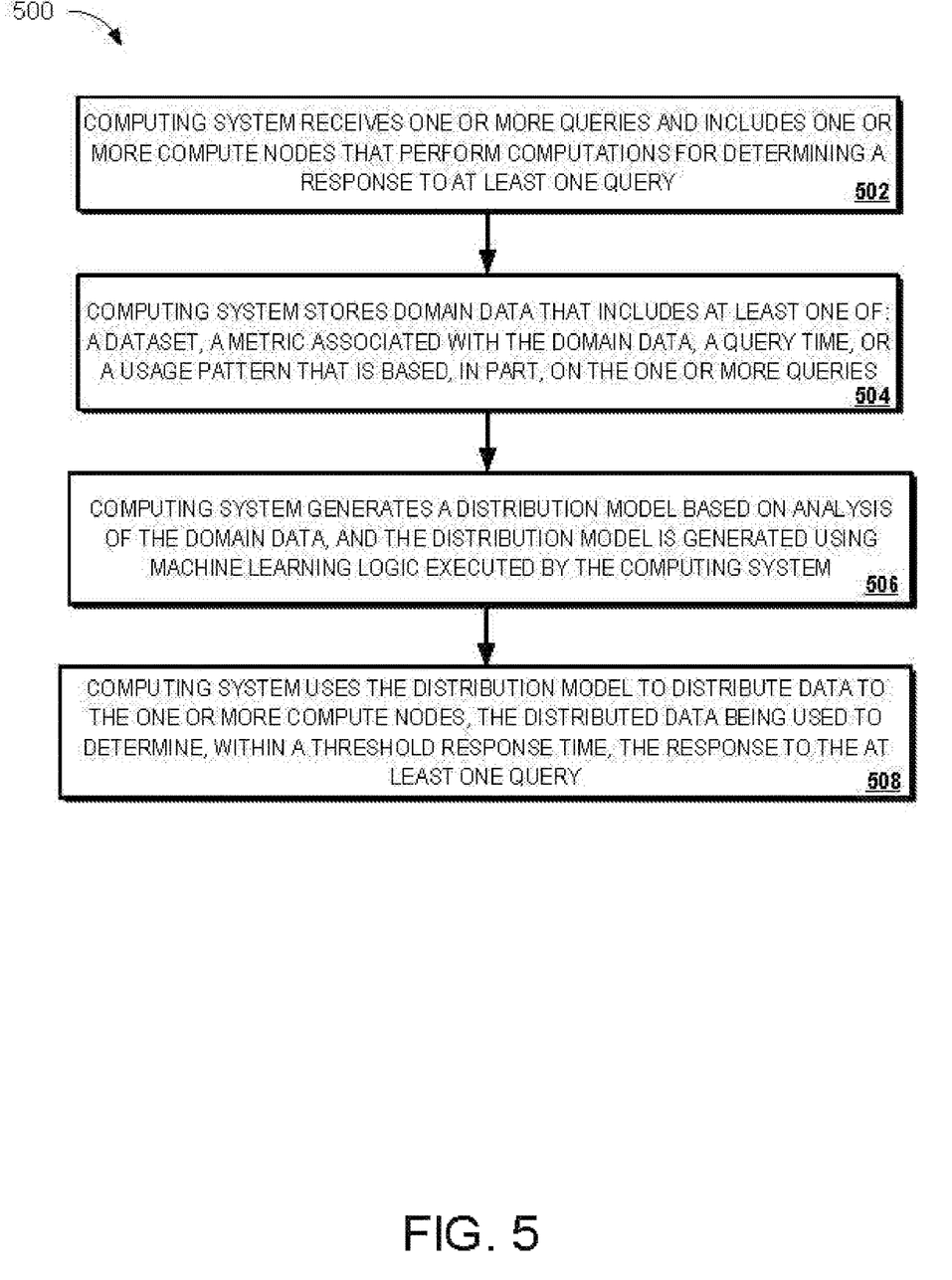
FIG. 5 is a process flow diagram of an example process for performing distributed computations using one or more compute nodes.

FIG. 5 is a process flow diagram of an example process 500 for performing distributed computations using one or more compute nodes. Process 500 can be implemented using components of systems 100 and 200. Thus, descriptions of process 500 may reference one or more of the above-mentioned computing resources of systems 100 and 200.

Process 500 begins at block 502 and includes computing system 100 receiving one or more queries. In some implementations, that queries received by system 100 based on user 102 submitting the query to system via console 104. System 100 can include one or more compute nodes 120a/b/c that perform computations for determining accurate responses to at least one query received by the system.

At block 504, computing system 100 stores domain data 108 in an example data storage device 106. Domain data 108 can include at least one of: datasets, metrics associated with domain data 108, query times for the one or more received queries, or usage patterns that are based, in part, on the one or more received queries and the metrics. In some implementations, in addition to storing domain data 108 in data store 106, system 100 can analyze the content of the one or more received queries.

For example, system 100 can use example n-gram analysis algorithms to analyze the content of received queries, as well as execute other analysis and extraction logic to extract various query terms and various query date/time attributes. The extracted terms and attributes are stored in data store 106. In some implementations, extracted query terms and attributes can be stored as datasets, metrics, or usage patterns of domain data 108.

In some implementations, in addition to analyzing content of the received queries, system 100 analyzes various data elements of domain data 108. For example, system 100 causes machine learning module 112 to execute a maximum likelihood algorithm to analyze the received queries, and to analyze data elements of domain data 108 stored in data store 106. In some instances, analysis of the received queries and data elements occurs over a predefined time period (e.g., 1-week or 3-months).

At block 506, system 100 generates at least one distribution model 118, 218 based on analysis of domain data 108. In some implementations, system 100 causes module 112 to generate the distribution model using machine learning logic executed by the system. For example, system 100 can cause module 112 to generate partitioning algorithms using learned or observed inferences derived from executing the maximum likelihood algorithm. The generated distribution model encodes the partitioning algorithm.

At block 508, system 100 uses the generated distribution model to distribute data to one or more compute nodes 120a/b/c. The generated distribution model is used to distribute domain data 108 accessed from data store 106. The data is distributed to nodes 120a/b/c in response to system 100 receiving a query from user 102 that seeks a response. System 100 uses the distributed data to compute, or determine, a response to the query within a threshold response time. For example, the threshold response time can be 5 seconds and system 100 computes an accurate response to the query in 5 seconds, or computes the accurate response in less than 5 seconds.

As used in this specification, the term "module" is intended to include, but is not limited to, one or more computers configured to execute one or more software programs that include program code that causes a processing unit(s) of the computer to execute one or more functions. The term "computer" is intended to include any data processing device, such as a desktop computer, a laptop computer, a mainframe computer, a personal digital assistant, a server, a handheld device, or any other device able to process data.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively, or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    training, using machine learning logic, a machine learning model based on a plurality of datasets comprising data from different domains, wherein the trained machine learning model is configured to distribute the plurality of datasets among a plurality of compute nodes based on a partitioning strategy of the plurality of datasets responsive to receiving a query;
    generating a distribution model from the trained machine learning model for output;
    receiving a first query;
    extracting content from the first query;
    in response to extracting content from the first query:
        determining, based on the distribution model, a partitioning strategy from (i) the extracted content from the first query and (ii) a set of inferences about usage patterns that include allocations of different types of domain data to the plurality of compute nodes, wherein the set of inferences (i) indicate use of data values in the plurality of datasets to respond to a previous query and (ii) indicate a number of data transfers performed between the plurality of compute nodes to respond to the previous query;
        partitioning the plurality of data sets by allocating respective portions of data for a given domain to a corresponding compute node based on the partitioning strategy;
        distributing, using the distribution model, the plurality of datasets to the plurality of compute nodes based on allocations of data for each of the different domains; and
        determining, using the distribution model, a response to the first query within a threshold response time based on the partitioning strategy of the plurality of datasets.

2. The computer-implemented method of claim 1, further comprising:
    using the distribution model to optimize distribution of the plurality of datasets to the plurality of compute nodes, wherein optimizing the distribution of the plurality of datasets, comprises:
        assigning a first dataset of the plurality of datasets to a first compute node to generate a first portion of the response; and
        assigning a second dataset of the plurality of datasets to at least a second compute node to generate a second portion of the response;
    generating, by the first compute node, the first portion of the response using the first dataset; and
    generating, using the second compute node, the second portion of the response using the second dataset.

3. The computer-implemented method of claim 1, wherein generating the distribution model comprises:
    using the machine learning logic to analyze one or more entities and respective data values of the plurality of datasets; and
    generating one or more partitioning algorithms based on the analyzed one or more entities and respective data values of the plurality of datasets.

4. The computer-implemented method of claim 3, wherein the distribution model encodes the one or more partitioning algorithms and the method includes:
    using at least one partitioning algorithm of the distribution model to distribute data to specific compute nodes of the plurality of compute nodes.

5. The computer-implemented method of claim 1, wherein training the machine learning model comprises:
    executing, by a processor, at least one maximum likelihood algorithm to process the plurality of datasets; and
    determining, by the processor, data partitioning logic in response to executing the maximum likelihood algorithm to process the plurality of datasets, wherein the data partitioning logic is operable to partition datasets of the plurality of datasets for distribution among the plurality of compute nodes to cause the response to the first query to be determined within the threshold response time, and
    wherein the distribution model is generated using at least the determined data partitioning logic.

6. The computer-implemented method of claim 5, further comprising:
    using the distribution model to determine parameters that maximize a likelihood of a future observation in the domain that is based, in part, on the usage pattern included in the plurality of datasets, wherein the future observation corresponds to one or more predicted queries.

7. The computer-implemented method of claim 1, wherein an entity in a dataset of the plurality of datasets is a query time that has a data value corresponding to at least one of:
 a current time, day, month, or year; or
 a particular time, day, month, or year that a query is received.

8. The computer-implemented method of claim 1, wherein the usage pattern is based on one or more sources of pattern behavior that include at least one of:
 a frequency attribute of a type of query of the first query;
 a frequency attribute of a metric correlated with the plurality of datasets and plurality of queries of the different domains; or
 a correlation of a user role with the first query and the metric.

9. The computer-implemented method of claim 1, wherein the threshold response time is at least one of:
 5 seconds;
 30 seconds; or
 60 seconds.

10. The computer-implemented of claim 1, further comprising:
 using the distribution model to optimize distribution of the plurality of datasets to the plurality of compute nodes, wherein optimizing the distribution of the plurality of datasets, comprises:
  assigning a first dataset of the plurality of datasets to a first compute node to generate a first portion of the response; and
  assigning a second dataset of the plurality of datasets to at least a second compute node to generate a second portion of the response;
 generating, by the first compute node, the first portion of the response using the first dataset;
 in response to generating the first portion of the response:
  storing, by the one or more processors, the first portion of the response in a data store;
  distributing, by the one or more processors, the first portion of the response to the second compute node;
  receiving, by the second compute node, the first portion of the response; and
  generating, using the second compute node, the second portion of the response using the second dataset and the first portion of the response.

11. The computer-implemented method of claim 10, further comprising, in response to generating the second portion of the response using the second dataset and the first portion of the response:
 determining, using the distribution model, the response to the first query within the threshold response time using (i) the first portion of the response generated by the first compute node and (ii) the second portion of the response generated by the second compute node; and
 providing the determined response for output.

12. The computer-implemented method of claim 1, wherein each domain of the different domains relate to professional disciplines that comprises healthcare, finance, technology, engineering, information technology, health and nutrition, and law.

13. The computer-implemented method of claim 1, wherein determining, based on the distribution model, the partitioning strategy from (i) the extracted content from the first query and (ii) the set of inferences about usage patterns that include allocations of different types of domain data to the plurality of compute nodes further comprises:
 providing, to the distribution model, one or more inputs comprising at least one of: (i) datasets related to the different domains, (ii) data indicative of user personas who submitted the requests, (iii) values indicative of metrics for each domain of the different domains, (iv) one or previous queries seeking responses against the data set, (v) one or more previous queries received during different parts of the day, different days of the week, and different days of the month, (vi) a number of computing nodes, (vii) computational resources of the system, and (viii) the extracted content from the first query; and
 in response, receiving, from the distribution model, the partitioning strategy.

14. The computer-implemented of claim 13, further comprising:
 using the distribution model to optimize distribution of the plurality of datasets to the plurality of compute nodes with the partitioning strategy, wherein optimizing the distribution of the plurality of datasets, comprises:
  assigning a first dataset of the plurality of datasets to a first compute node to generate a first portion of the response; and
  assigning a second dataset of the plurality of datasets to at least a second compute node to generate a second portion of the response;
 generating, by the first compute node, the first portion of the response using the first dataset; and
 generating, using the second compute node, the second portion of the response using the second dataset.

15. The computer-implemented method of claim 1, wherein providing the determined response for output comprises providing the response to the first query to a device, causing the device to display data indicative of the response on a graphical user interface for a user to review.

16. A distributed computing system, comprising:
 one or more processing devices;
 one or more non-transitory machine-readable storage devices storing instructions that are executable by the one or more processing devices to cause performance of operations comprising:
  training, using machine learning logic, a machine learning model based on a plurality of datasets comprising data from different domains, wherein the trained machine learning model is configured to distribute the plurality of datasets among a plurality of compute nodes based on a partitioning strategy of the plurality of datasets responsive to receiving a query;
  generating a distribution model from the trained machine learning model for output;
  receiving a first query;
  extracting content from the first query;
  in response to extracting content from the first query:
   determining, based on the distribution model, a partitioning strategy from (i) the extracted content from the first query and (ii) a set of inferences about usage patterns that include allocations of different types of domain data to the plurality of compute nodes, wherein the set of inferences (i) indicate use of data values in the plurality of datasets to respond to a previous query and (ii)

indicate a number of data transfers performed between the plurality of compute nodes to respond to the previous query;

partitioning the plurality of data sets by allocating respective portions of data for a given domain to a corresponding compute node based on the partitioning strategy;

distributing, using the distribution model, the plurality of datasets to the plurality of compute nodes based on allocations of data for each of the different domains; and determining, using the distribution model, a response to the first query within a threshold response time based on the partitioning of the plurality of datasets.

17. The distributed computing system of claim 16, wherein the operations further comprise:

using the distribution model to optimize distribution of the plurality of datasets to the plurality of compute nodes, wherein optimizing the distribution of the plurality of datasets, comprises:

assigning a first dataset of the plurality of datasets to a first compute node to generate a first portion of the response; and assigning a second dataset of the plurality of datasets to at least a second compute node to generate a second portion of the response;

generating, by the first compute node, the first portion of the response using the first dataset; and generating, using the second compute node, the second portion of the response using the second dataset.

18. The distributed computing system of claim 16, wherein generating the distribution model comprises:

using the machine learning logic to analyze one or more entities and respective data values of the plurality of datasets; and generating one or more partitioning algorithms based on the analyzed one or more entities and respective data values of the plurality of datasets.

19. The distributed computing system of claim 18, wherein the distribution model encodes the one or more partitioning algorithms and the operations comprise:

using at least one partitioning algorithm of the distribution model to distribute data to specific compute nodes of the plurality of compute nodes.

20. The distributed computing system of claim 16, wherein training the machine learning model comprises:

executing, by a processor of the distributed computing system, at least one maximum likelihood algorithm to process the plurality of datasets; and determining, by the processor, data partitioning logic in response to executing the maximum likelihood algorithm to process the plurality of datasets, wherein the data partitioning logic is operable to partition datasets of the plurality of datasets for distribution among the plurality of compute nodes to cause the response to the at least one query to be determined within the threshold response time, and wherein the distribution model is generated using at least the determined data partitioning logic.

21. The distributed computing system of claim 20, wherein the operations further comprise:

using the distribution model to determine parameters that maximize a likelihood of a future observation in a domain that is based, in part, on the usage pattern included in the plurality of datasets, wherein the future observation corresponds to one or more predicted queries.

22. The distributed computing system of claim 16, wherein an entity in a dataset of the plurality of datasets is a query time that has a data value corresponding to at least one of:

a current time, day, month, or year; or a particular time, day, month, or year that a query is received by the distributed computing system.

23. The distributed computing system of claim 16, wherein the usage pattern is based on one or more sources of pattern behavior that include at least one of:

a frequency attribute of a type of query of the first query;

a frequency attribute of a metric correlated with the plurality of datasets and plurality of queries of the different domains; or a correlation of a user role with the first query and the metric.

24. The distributed computing system of claim 16, wherein the threshold response time is at least one of:

5 seconds;

30 seconds; or 60 seconds.

25. One or more non-transitory machine-readable storage devices storing instructions that are executable by one or more processing devices to cause performance of operations comprising:

training, using machine learning logic, a machine learning model based on a plurality of datasets comprising data from different domains, wherein the trained machine learning model is configured to distribute the plurality of datasets among a plurality of compute nodes based on a partitioning strategy of the plurality of datasets responsive to receiving a query;

generating a distribution model from the trained machine learning model for output;

receiving a first query;

extracting content from the first query;

in response to extracting content from the first query:

determining, based on the distribution model, a partitioning strategy from (i) the extracted content from the first query and (ii) a set of inferences about usage patterns that include allocations of different types of domain data to the plurality of compute nodes, wherein the set of inferences (i) indicate use of data values in the plurality of datasets to respond to a previous query and (ii) indicate a number of data transfers performed between the plurality of compute nodes to respond to the previous query;

partitioning the plurality of data sets by allocating respective portions of data for a given domain to a corresponding compute node based on the partitioning strategy;

distributing, using the distribution model, the plurality of datasets to the plurality of compute nodes based on allocations of data for each of the different domains; and determining, using the distribution model, a response to the first query within a threshold response time based on the partitioning strategy of the plurality of datasets.

26. The one or more machine-readable storage devices of claim 25, wherein the operations further comprise:

using the distribution model to optimize distribution of the plurality of datasets to the plurality of compute nodes, wherein optimizing the distribution of the plurality of datasets, comprises:
assigning a first dataset of the plurality of datasets to a first compute node to generate a first portion of the response; and
assigning a second dataset of the plurality of datasets to at least a second compute node to generate a second portion of the response;
generating, by the first compute node, the first portion of the response using the first dataset; and
generating, using the second compute node, the second portion of the response using the second dataset.

\* \* \* \* \*

UNITED STATES PATENT AND TRADEMARK OFFICE
CERTIFICATE OF CORRECTION

PATENT NO. : 11,620,565 B1
APPLICATION NO. : 15/441511
DATED : April 4, 2023
INVENTOR(S) : Mir Tariq It is certified that error appears in the above-identified patent and that said Letters Patent is hereby corrected as shown below:

In the Claims

Column 18, Line 10, Claim 13, delete "data set" and insert -- dataset --.

Signed and Sealed this
Thirtieth Day of May, 2023

Katherine Kelly Vidal
*Director of the United States Patent and Trademark Office*